United States Patent [19]

Ohguchi

[11] Patent Number: 5,493,329

[45] Date of Patent: Feb. 20, 1996

[54] PICTURE TRANSMISSION SYSTEM

[75] Inventor: Yuji Ohguchi, Tsurugashima, Japan

[73] Assignee: Toko Kabushiki Kaisha, Tokyo, Japan

[21] Appl. No.: 316,349

[22] Filed: Sep. 30, 1994

[30] Foreign Application Priority Data

Oct. 1, 1993 [JP] Japan .................................. 5-269524

[51] Int. Cl.$^6$ .................................................... H04N 7/14
[52] U.S. Cl. ................... 348/17; 348/14; 348/18; 348/19
[58] Field of Search ................... 348/17, 18, 19, 348/16, 14, 15, 24, 220, 458, 559, 561, 705, 443, 415, 416; 379/96; H04N 7/14, 7/15

[56] References Cited

U.S. PATENT DOCUMENTS 5,063,440 11/1991 Hong ........................................ 348/18
5,389,965 2/1995 Kuzma ..................................... 348/17

FOREIGN PATENT DOCUMENTS 405308633 11/1993 Japan .............................. H04N 7/14

Primary Examiner—Curtis Kuntz
Assistant Examiner—Stella L. Woo
Attorney, Agent, or Firm—Cushman Darby & Cushman

[57] ABSTRACT

A picture transmission system used in a picture remote surveillance system or a visual telephone, etc. is provided. This picture transmission system includes, on the transmitter side, an A-D converter for converting an analog video input signal into a digital picture signal, a moving picture converting section for converting the picture signal into a reduced moving picture, a video encoder for compression-encoding the reduced moving picture by the hybrid coding system. In this picture transmission system, on the transmitter side, a switch operative in response to a signal from the receiver side is provided between the A-D converter and the moving picture converting section, and a still picture converting section is inserted between the switch and the video encoder. A picture signal outputted from the A-D converter is permitted to be selectively inputted to either the moving picture converting section or the still picture converting section. Thus, when the switch is switched to the still picture converting section side, a picture signal of one frame is divided into plural picture signals having the same size as that of the reduced moving picture so that those plural divided picture signals are sequentially applied to the video encoder.

3 Claims, 3 Drawing Sheets

PICTURE TRANSMISSION SYSTEM

BACKGROUND OF THE INVENTION

1. Field of the Invention

This invention relates to a picture transmission system used in a picture remote surveillance system or a visual telephone, etc.

2. Description of the Related Art

Moving pictures have compression efficiency higher than still pictures, and can be advantageously transmitted at a low transmission rate. As a moving picture transmission system as mentioned above, systems based on the H.261 standard of CCITT (Comité Consultatif International Télégraphique et Téléphonique) are generally used. On the other hand, as a transmission system for still picture, there are systems having transmission efficiency caused to be improved by the picture compression/decompression technology in conformity with the JPEG (Joint Photographic Coding Experts Group) standard or corresponding thereto.

In the case of a moving picture transmitted at a low transmission rate, moving pictures of natural motion (movement) can be obtained on real time basis, but the picture quality disadvantageously becomes lower. For example in the case where surveillance at a remote place is carried out by such moving picture, there was the problem that even if an extraordinary state takes place and an operator notices the of picture on the screen, the image is unclear or obscure to such a degree that the operator cannot discriminate the detailed portions, thus failing to obtain detailed information.

On the contrary, in the case of a transmission of still picture, higher picture quality can be obtained as compared to that of a moving picture, a but the compression efficiency is lower and it takes much time in transmission. For this reason, motion was discontinuous so that the picture becomes difficult to see and there was the possibility that operator may overlook important information.

SUMMARY OF THE INVENTION

With the above in view, an object of this invention is to provide a picture transmission system which is operative as a moving picture transmission system of a low transmission rate in ordinary state, and can transmit a clearer still picture as occasion demands in the intervals of transmission of moving picture.

To achieve the above-mentioned object, in accordance with this invention, there is provided a picture transmission system comprising: a transmitter including an A-D converter for converting an analog video input signal into a digital picture signal, a moving picture converting section for converting the picture signal outputted from the A-D converter into a reduced moving picture, and a video encoder for compression-encoding the reduced moving picture by the hybrid coding system; and a receiver for receiving the video signal through the transmission line;

characterized in that the switching means is operative in response to a signal from the receiver is provided between the A-D converter and the moving picture converting section, and a still picture converting section is inserted between the switching means and the video encoder, a picture signal outputted from the A-D converter being permitted to be selectively inputted to either the moving picture converting section or the still picture converting section by the switching means, whereby when the switching means is switched to the still picture converting section side, a picture signal of one frame is divided into a plurality of picture signals having the same size as that of the reduced moving picture in the still picture converting section so that those plural divided picture signals are sequentially applied to the video encoder.

DESCRIPTION OF THE PREFERRED EMBODIMENT

Figure 1:
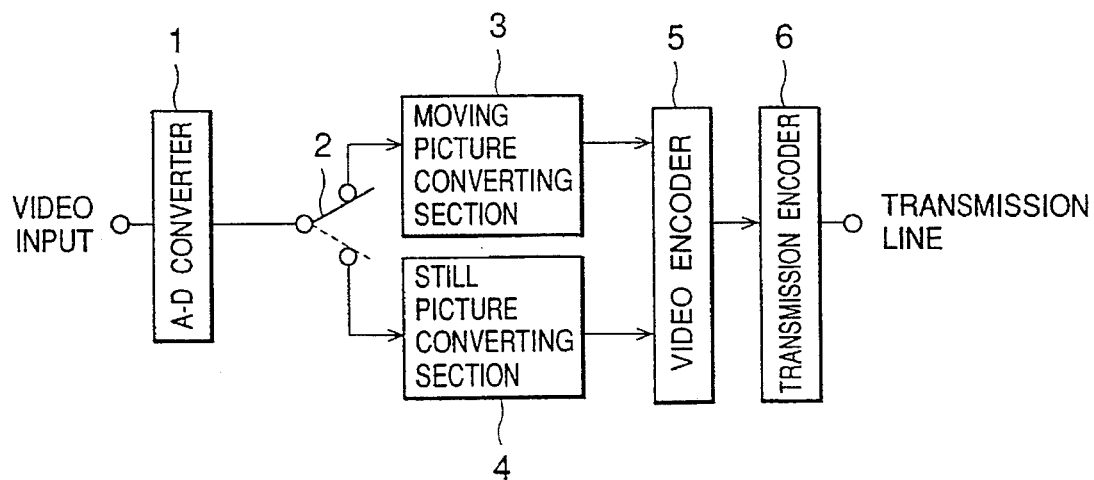
FIG. 1 is a block diagram showing an example of outline of the configuration of the transmitter side in a picture transmission system according to this invention.
Figure 2:
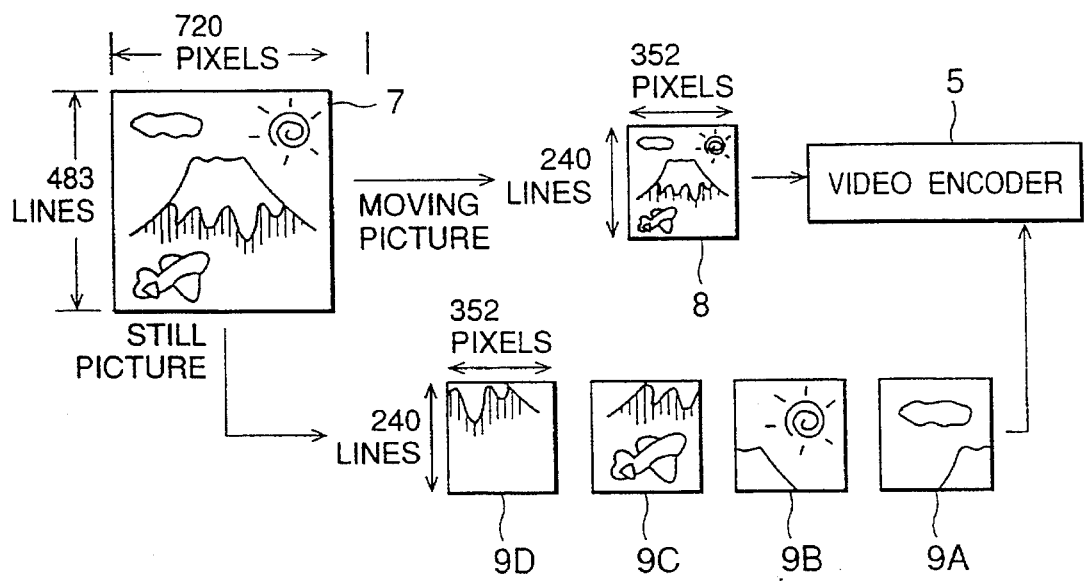
FIG. 2 is an explanatory view of picture conversion in the picture transmission system of this invention.

FIG. 1 is a block diagram showing an example of outline of the configuration of the transmitter side in a picture transmission system of this invention, and FIG. 2 is an explanatory view of picture conversion.

In FIG. 1, reference numeral 1 denotes an A-D converter for converting an analog video input signal delivered from a video camera, etc. into a digital picture signal. The picture signal output from the A-D converter 1 is switched by a switch 2 and is inputted to either a moving picture converting section 3 or a still picture converting section 4 for carrying out pre-processing for coding. At the moving picture converting section 3, as shown in FIG. 2, an original picture 7 of one frame having numbers of pixels in vertical and horizontal directions of 483 lines×720 pixels is converted into reduced moving picture 8 having the numbers of pixels in vertical and horizontal directions of 240 lines×352 pixels which are substantially one half of the numbers of pixels in longitudinal and lateral directions of the original picture. The reduced moving picture 8 thus obtained is delivered to video (signal) encoder 5 of the next stage.

On the other hand, at the still picture converting section 4, the original picture 7 of one frame is divided into four picture signals (240 lines×352 pixels) having the same size as that of reduced moving picture 8, i.e., ¼ of one frame without carrying out reduction. Signals of these four pictures 9A, 9B, 9C, 9D are sequentially output to the video encoder 5 in conformity with the H.261 standard.

A picture signal of reduced moving picture 8 applied from moving picture converting section 3 to video encoder 5, or each of picture signals of divided pictures 9A, 9B, 9C, 9D applied from still picture converting section 4 to video encoder 5 is compression-coded in the INTRA mode (intra-frame correlation mode), and is then caused to undergo coding for correcting errors generated in the transmission line at the transmission encoder 6. The coded signal thus obtained is transmitted to the transmission line.

It should be noted that, as video encoder 5, there may be employed any encoder adapted for carrying out compression-coding by hybrid coding system in which arbitrary ones of DCT (Discrete Cosine Transform), Motion Compensated Predictive Coding, Inter Frame Predictive Coding and the like are combined, and an encoder in conformity with the H.261 standard is not necessarily required.

Figure 3:
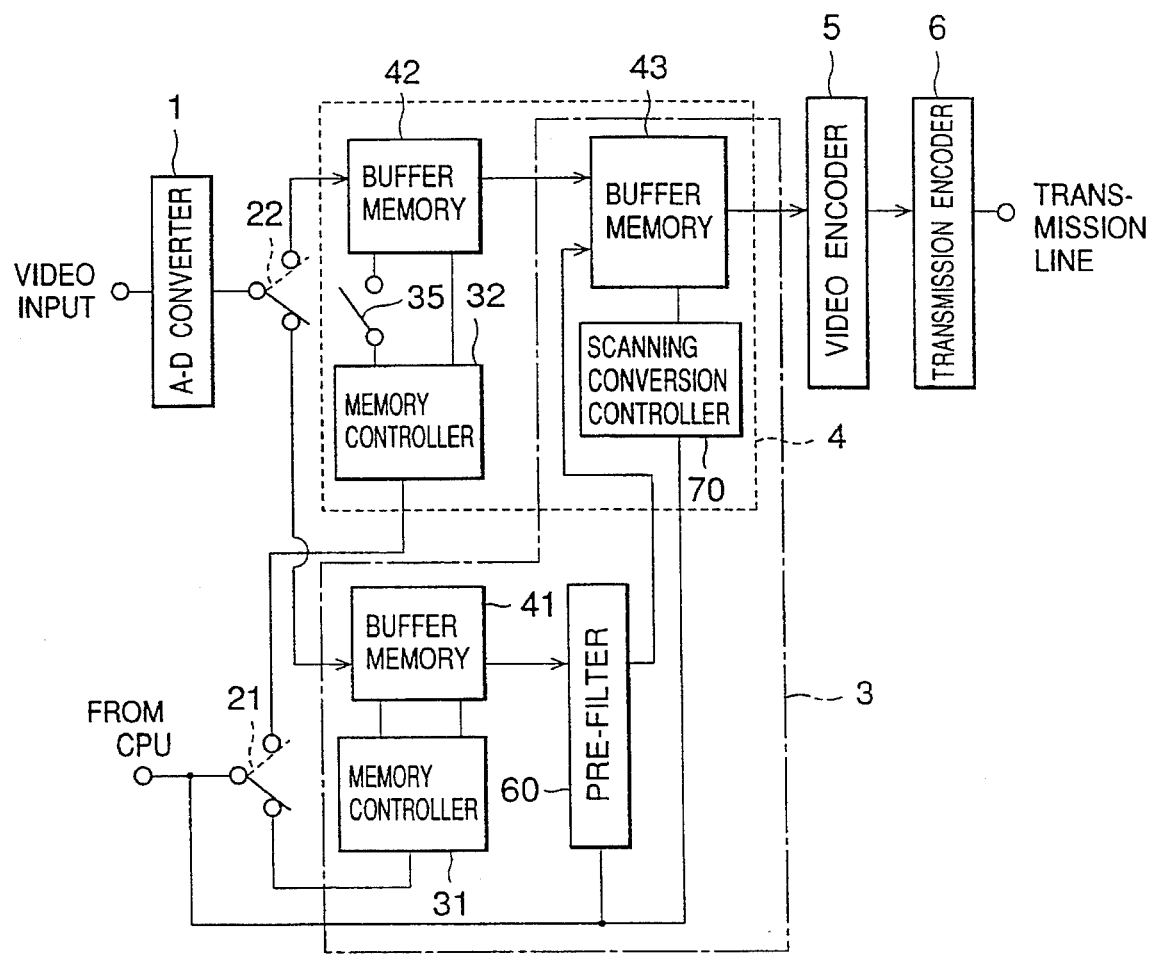
FIG. 3 is a block diagram showing an example of the configuration of the transmitter side in an embodiment of the picture transmission system according to this invention.

FIG. 3 is a block diagram showing an embodiment of more practical configuration of the transmitter side. In FIG. 3, reference numeral 1 denotes an A-D converter, reference numeral 3 denotes a moving picture converting section, and reference numeral 4 denotes a still picture converting section. Further, reference numeral 41 denotes a buffer memory for moving pictures, reference numeral 60 denotes a pre-filter, reference numeral 42 denotes a buffer memory for still pictures, reference numeral 43 denotes a buffer memory for carrying out scanning conversion, reference numeral 70 denotes a scanning conversion controller for controlling scanning conversion operation in the buffer memory 43, reference numeral 5 denotes a video encoder in conformity with the H.261 standard, and reference numeral 6 denotes a transmission encoder. Buffer memory 43 and scanning conversion controller 70 are used in both moving picture converting section 3 and still picture converting section 4.

Moreover, reference numeral 31 denotes a memory controller for carrying out picture write and picture read control of buffer memory 41, and reference numeral 32 denotes a memory controller for carrying out picture write and picture read control of buffer memory 42. The operations of memory controllers 31, 32 are both controlled by a signal from CPU (not shown). On the picture write side between memory controller 32 and buffer memory 42, a switch 35 which is turned ON or OFF synchronous with the frame signal of the picture signal is provided. Reference numerals 21, 22 denote switches operative in a manner interlocking with each other. These switches correspond to switch 2 of FIG. 1. While buffer memory 41 and buffer memory 42 are separately indicated for convenience in FIG. 3, a portion of buffer memory 42 for still pictures is also used in the case of moving picture, thereby making it possible to use the same buffer memory commonly to both of the buffer memories.

In the state where switches 21, 22 are switched to the moving picture transmission side as shown in FIG. 3, the picture signal output from the A-D converter 1 is held in a reduced form by buffer memory 41 as are every luminance signal Y and chrominance signals $C_B$, $C_R$. Such luminance and chrominance signals are caused to respectively undergo filtering processing at pre-filter 60, and are then delivered to buffer memory 43. On the other hand, in the case where switches 21, 22 are switched to the still picture transmission side in a direction opposite to that of FIG. 3, switch 35 is closed. As a result, a picture write instruction of one frame is outputted from memory controller 32. Thus, luminance signal Y, color difference signals $C_B$, $C_R$ constituting picture signal from A-D converter 1 are held at buffer memory 42 as they are, and are then delivered to buffer memory 43. After switch 35 is turned ON only for one frame period of the picture signal, it is immediately turned OFF, and continues in the OFF state until a request for updating of the still picture which will be described later is output from the receiver side.

The picture signal applied to buffer memory 43 is sent to video encoder 5 in such a manner that picture data are caused to undergo sequencing for every fundamental block. After such the picture signal is caused to undergo compression-coding, this compression-coded picture signal is coded so that it becomes a signal in conformity with the transmission line at transmission encoder 6, and is output from the transmission line. It is to be noted that with respect to the picture signal, luminance signal Y and chrominance signals $C_B$, $C_R$ are processed in parallel until they are inputted to buffer memories 41, 42. From the time when such picture signals are output from buffer memories 41, 42, they are sent in the state where they are caused to undergo sequencing so that they are arranged in series.

At the receiver side which has received the picture signal from the transmitter though the transmission path, the image is restored by the video decoder in conformity with the H.261 standard and buffer memories, and is delivered to the receiver. With respect to the image at this time, in the case of moving picture, pictures quality is deteriorated by a degree such that it is caused to undergo compression transform processing. On the contrary, in the case of still pictures, since the picture of one frame is sent in a manner divided into four pictures without being reduced, a picture of high resolution closer to the original picture can be obtained.

Figure 4:
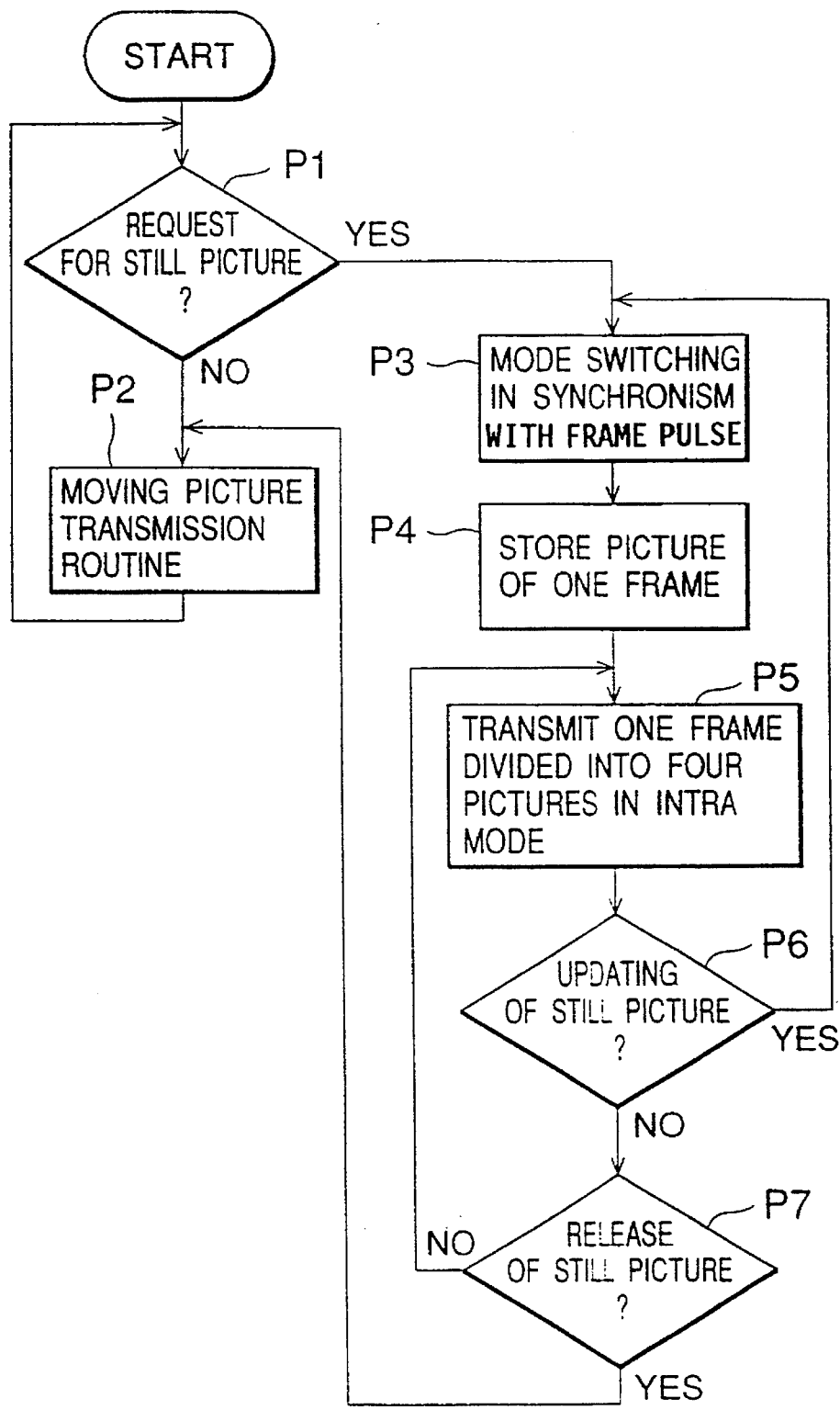
FIG. 4 is a flowchart showing the flow of operation of a control system in the embodiment of the picture transmission system according to this invention.

FIG. 4 is a flowchart showing flow of the operation of control system in the embodiment of the picture transmission system of this invention.

If there is no interrupt request for still picture at the first step P1, an operation to process routine for the transmitting moving picture to return to the step P1 is repeated at step P2 to continue transmitting moving pictures.

When a request for a still picture is given by depressing a predetermined key of the keyboard on the receiver side, processing the operation shifts to routine transmission of the still picture starting from step P3. First, at step P3, the operation mode is switched to the still picture mode synchronous synchronism with frame pulse. When switch 35 of FIG. 3 is closed, a new picture of one frame is stored at step P4. At step P5, the picture of one frame is divided into four pictures of 9A, 9B, 9C, 9D as shown in FIG. 2 in the INTRA mode, for example, to sequentially send out these four picture signals one by one. These four divided pictures are restored to a still picture of one frame on the receiving side. Then, if there is no request for updating of the still picture at step P6 and there is no request for releasing of the still picture also at step P7, the processing operation returns to step P5 to continue to send still pictures of the same image.

If the key of the receiver side is depressed and a new request for a still picture is made at step P6, the processing operation returns to step P3 to carry the out processing operation similar to the above to send a out new still picture at that time. On the other hand, in the case where a request for releasing transmission of the still picture is made at step P7, processing operation returns to step P2, resulting in an ordinary moving picture transmission state.

It is to be noted that, for controlling the transmission of the still picture at step P5, spare bits $S_0$, $S_1$ which have been incorporated into the picture signal may be utilized. For example, when bits of the picture of 9A of FIG. 2 are set so that $S_0=1$ and $S_1=0$, and bits $S_0$, $S_1$ of the remaining three pictures of 9B, 9C and 9D are set so that $S_0=0$ and $S_1=0$, it is possible to carry out, at the receiver side, switching to the moving picture receiving state when $S_0=1$ is detected.

It should be noted that the while picture of one frame is divided into four pictures in the above-described embodiment, it may be divided into, e.g., sixteen pictures in addition to the above-described division into four pictures.

In accordance with this invention, it is possible to provide a picture transmission system which serves as a moving picture transmission system operative at a low transmission rate in an ordinary state, and can transmit clear still pictures as occasion demands in accordance with request from the receiver side in the intervals of transmission of moving picture.

Moreover, since the original picture is coded without reduction at the time of transmission of still picture, a fine still picture of high picture quality closer to the original picture can be obtained. Further, the since video encoder and video decoder which are in conformity with the International Standard for transmission of moving pictures can be used commonly for transmission of the still picture, it is sufficient to slightly change the circuit configuration for this purpose. In addition, it is possible to advantageously continuously transmit still pictures while successively updating them without returning to the moving picture transmission state.

What is claimed is:

1. A picture transmission system comprising:

a receiver;

a transmission line having a first and a second end and being connected at the first end to the receiver; and a transmitter connected to the second end of the transmission line comprising:

an A-D converter for converting an analog video input signal into a digital picture signal;

a moving picture converting section for converting the digital picture signal into a reduced moving picture;

a video encoder for compression-encoding the reduced moving picture by a preselected hybrid coding system;

a transmission encoder for receiving a video signal coded by the video encoder and transmitting the video signal to the transmission line;

switching means located between the A-D converter and the moving picture converting section operative in response to a still picture switching signal and a moving picture switching signal from the receiver; and a still picture converting section inserted between the switching means and the video encoder;

wherein, the digital picture signal output from the A-D converter is permitted to be selectively input to either the moving picture converting section or the still picture converting section by the switching means and wherein when the switching means is switched to the still picture converting section in response to the still picture switching signal, in the still picture converting section a picture signal of one frame is divided into a plurality of picture signals having substantially the same size as that of the reduced moving picture so that the divided picture signals are sequentially applied to the video encoder.

2. A picture transmission system as in claim 1, wherein the number of divisions of the picture signal of one frame in the still picture converting section is 4.

3. A picture transmission system as in claim 1, wherein the still picture converting section comprises a second switching means operative in response to the signals from the receiver wherein when the second switching means is switched in response to the still picture switching signal, divisional processing of one frame is repeated by the still picture converting section based on a new picture signal input from the A-D converter.

* * * * *